United States Patent [19]

Hart et al.

[11] Patent Number: 5,159,259
[45] Date of Patent: Oct. 27, 1992

[54] POWER SUPPLY SYSTEM FOR CONTINUOUSLY ENERGIZING A D.C. LOAD

[75] Inventors: Stephen Hart; Pat. Ryan, both of Atlanta; Paul Powell, Duluth, all of Ga.

[73] Assignee: American Signal Company, Atlanta, Ga.

[21] Appl. No.: 730,197

[22] Filed: Jul. 15, 1991

[51] Int. Cl.⁵ .............................................. H02J 7/00
[52] U.S. Cl. .......................................... 320/62; 290/50
[58] Field of Search ....................... 320/61, 62, 63, 64, 320/68; 322/10, 11, 12, 13; 290/50; 318/139

[56] References Cited

U.S. PATENT DOCUMENTS

| | | | |
|---|---|---|---|
| 3,719,881 | 3/1973 | Shibata et al. | 320/62 |
| 3,991,357 | 11/1976 | Kaminski | 320/62 X |
| 4,313,080 | 1/1982 | Park | 320/61 |
| 4,888,702 | 12/1989 | Gerken et al. | 320/62 X |
| 5,081,365 | 1/1992 | Field et al. | 290/50 X |

Primary Examiner—William H. Beha, Jr.
Assistant Examiner—Kristine Peckman
Attorney, Agent, or Firm—Edward H. Loveman

[57] ABSTRACT

This power supply system for a D.C. electrical load, such as an illuminated sign, is normally energized by batteries. A central processing unit monitors the battery voltage and when it falls below a predetermined magnitude, the central processing unit then activates a starter motor which cranks an engine coupled to it. The central processing unit also actuates a valve and fuel pump to pass fuel to the engine. The engine drives an alternator which produces A.C. voltage which is then rectified by aa rectifier to recharge the batteries. When the batteries are fully charged the central processing unit stops the engine. The central processing unit employs a microprocessor chip to control operations of the system.

6 Claims, 2 Drawing Sheets

POWER SUPPLY SYSTEM FOR CONTINUOUSLY ENERGIZING A D.C. LOAD

BACKGROUND OF THE INVENTION

1. Field of the Invention

This invention concerns a self-contained power supply system for continuously energizing a D.C. electrical load for long periods of time while requiring minimum maintenance.

2. Description of the Prior Art

Formerly, it has been difficult or impossible to energize continuously an electrical load such as an illuminated sign for long periods of time with minimum maintenance when the sign is located in an area where there are no power transmission lines.

SUMMARY OF THE INVENTION

The present invention is directed to providing a system for continuously energizing a D.C. electrical load such as an illuminated sign display, without reliance on remotely generated A.C. voltage provided by transmission lines from an electrical generator. According to the invention the electrical load is energized by a battery or bank of batteries. The D.C. voltage output of the battery is monitored by a central processing unit (CPU) containing a microprocessor chip and associated computer chips. Connected in circuit with the CPU is a starter motor arranged to mechanically crank an internal combustion engine when the battery voltage falls to a predetermined magnitude. Some portion of the battery bank energizes the engine and the remaining balance of the battery bank produces the proper voltage to power both the CPU and the sign display. When the battery voltage falls below a specified magnitude recorded in a memory unit connected to the microprocessor the starter motor is energized.

A tachometer monitors the engine speed after the engine starts. The tachometer is connected in circuit with the CPU. The engine is energized by fuel supplied via a fuel pump to the engine under control of the CPU. The engine drives an alternator which generates A.C. voltage which is applied to a rectifier to charge the batteries which continue to energize the D.C. load. When the batteries become fully charged, the CPU cuts off the fuel supply to the engine to stop the alternator and stop charging the batteries.

It is therefore a principal object of the invention to provide a power supply system for energizing a D.C. load such as an illuminated sign for long periods of time requiring minimum maintenance.

Another object of the present invention is to provide a system as described in which a starter motor for cranking an engine, a tachometer for monitoring the engine, a fuel supply for the engine and a battery supply for energizing the starter and the illuminated sign are all monitored and controlled by a CPU.

Still another object of the present invention is to provide a system as described, wherein the battery supply is automatically recharged by an alternator driven by the engine, when the battery voltage falls to a preset magnitude.

These and other objects and many of the attendant advantages of this invention will be readily appreciated as the same becomes better understood by reference to the following detailed description when considered in connection with the accompanying drawings in which:

DESCRIPTION OF THE PREFERRED EMBODIMENT

Figure 1:
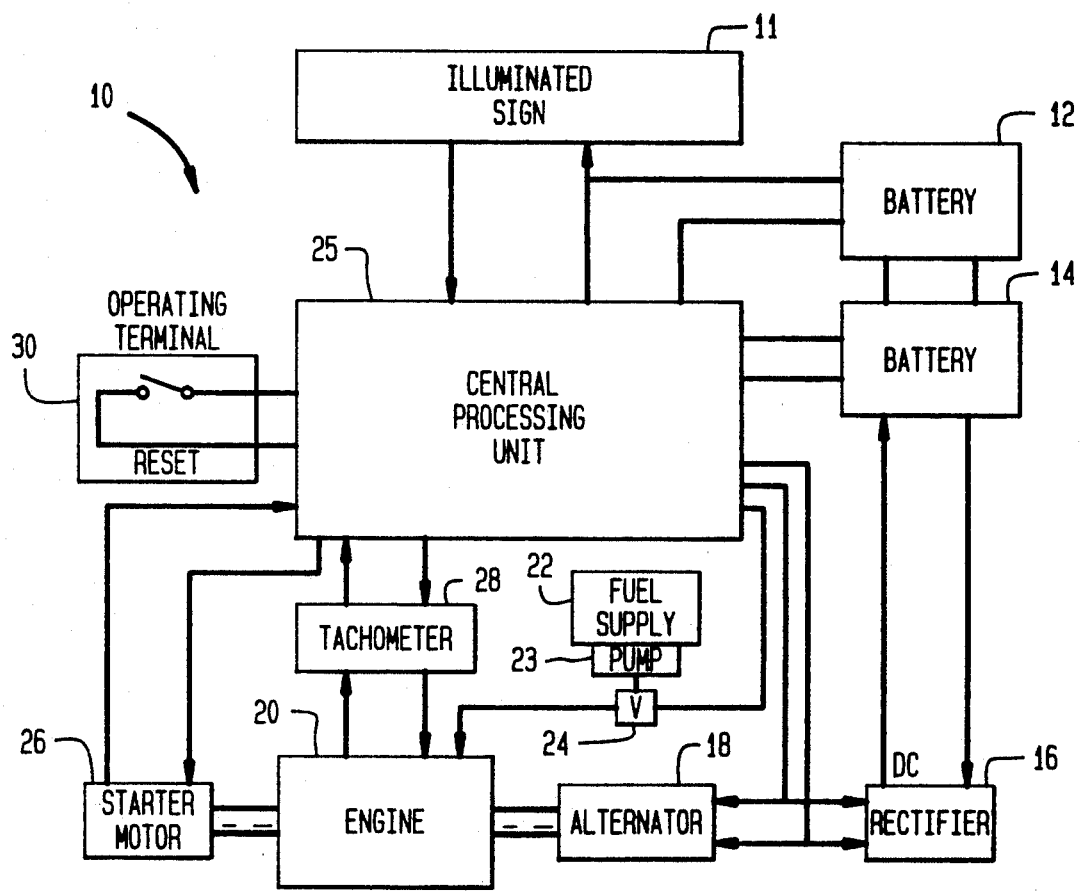
FIG. 1 shows a block diagram of the power supply system in simplified form.

Referring now to FIG. 1 wherein like reference characters designate like or corresponding parts throughout, there is shown a power supply system designated generally by numeral 10. A D.C. electrical load such as an illuminated sign 11 is energized by a rechargeable first battery 12 connected in series with a second battery 14. The batteries are recharged via a rectifier 16. The rectifier 16 is connected to an alternator 18 which provides A.C. voltage to the rectifier 16. The alternator 18 is driven by an internal combustion engine 20 supplied with fuel from a tank 22. The fuel is dispensed via a valve 24 to the engine under control of a microprocessor in the computerized control circuit 25. The engine is normally off and is started by a motor driven starter 26 which is energized by one of the batteries to crank the engine. A control circuit 25 monitors the speed the engine 20 via a tachometer 28. The batteries 14 and 12 power the CPU which monitors the battery voltage. When the voltage drops below a preset level the CPU will connect the battery voltage to the engine starter 26.

Figure 2:
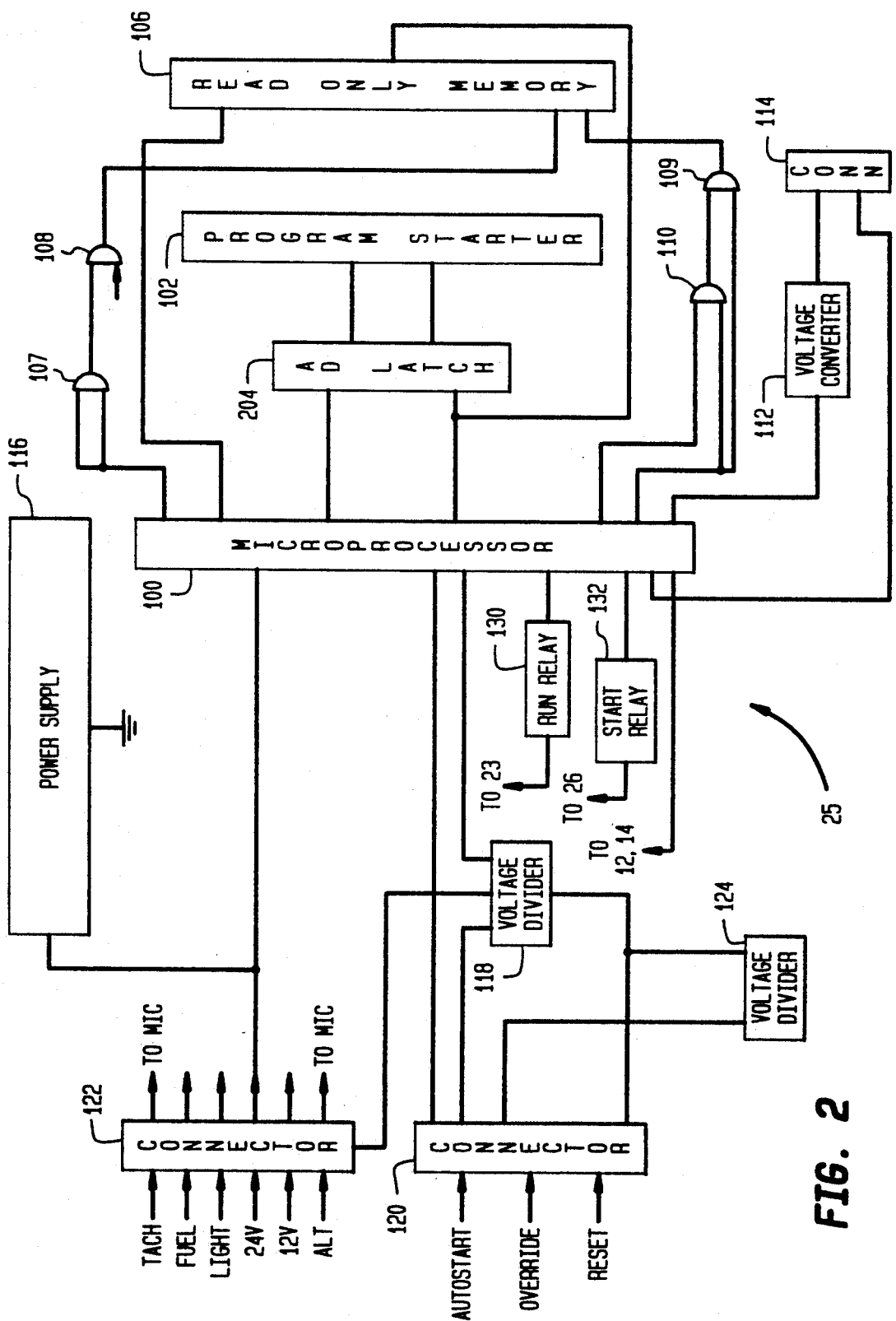
FIG. 2 is a diagram of the power supply control circuit.

Referring now to FIG. 2, there is shown a diagram of the central processing unit (CPU) 25 employed in system 10. The CPU 25 includes a microprocessor 100. This is a computer chip having components which control operation of the system. Connected to microprocessor 100 is an address latch 102 which receives instructions from a standard type #27256 chip 104 which starts the program of operation of the system. Also connected in circuit with microprocessor 100 is a standard type #28256 chip 106 which is an erasable read-only memory unit used to store engine parameters and messages. Four NAND gates 107, 108, 109 and 110 are connected to the microprocessor 100 for address selection of instructions from the microprocessor. A voltage converter 112 is type #RS232 unit which is connected to a consentional computer microprocessor 100. The voltage converter 112 converts the five volts used in the microprocessor to twelve volts used in the system 10 to communicate to the operator terminal.

A connector 114 connects the microprocessor 100 to the operator terminal 30 (FIG. 1) which controls the central processing unit 25. A power supply 116 which includes associated capacitors and resistors is connected to the microprocessor 100. A pair of voltage dividers 118 and 124 are connected to a pair of connectors 120 and 122 which in turn are connected to the microprocessor 100. The voltage dividers 118 and 124 take a 24 volts signal from the connectors 120 and 122 and reduce the voltage to five volts which the microprocessor requires.

The connector 122 has several inputs labelled TACH, FUEL, LIGHT, 24 Volts and 12 Volts. The TACH input indicates the applied voltage that is obtained from the tachometer 28 and is used to sense the speed of the engine 20; see FIG. 1. The 24 volt and 12 volt inputs are applied to the microprocessor and are monitored there for variations from the nominal values recorded in the memory unit 106. The batteries 12 and 14 (FIG. 1) are connected in series. When the microprocessor notes that the battery voltage is below the nominal set at the memory 106 it will send signals to engage relays which perform the switching function. The RUN relay 130 drives the fuel pump 23 and energizes the START relay 132 which turns on the starter 26 for the engine 20. The connector 122 provides a tachometer voltage signal from tachometer which is applied to microprocessor 100. The alternator 18 is monitored by the microprocessor 100 to determine that it is running a preset time after the starter 26 is energized. If the engine 20 is not yet running, the starter 26 will be deenergized, and a further attempt will be made to start the engine.

In operation of the system 10, the Central Processing Unit 25 senses the voltage of the batteries 12, and 14 and the batteries energize the D.C. load 11 which may be an illuminated sign or other electrical load. When the CPU 25 senses that the voltage from either of the batteries 12, 14 has fallen below a predetermined magnitude, the CPU 25 opens valve 24 and fuel passes from the fuel supply 22 via fuel pump 23 to engine 20. The CPU 25 also applies a voltage from the battery 14 to energize the starter motor 26. The engine is started by the starter motor 26 which is turned off as soon as the engine starts, The starting of the engine is sensed by tachometer 28. The tachometer 28 monitors the speed of engine 20. After a short predetermined time to allow the engine to warm up the CPU 25 activates the alternator 18 which is driven by the engine 20. The activated alternator generates A.C. voltage which is applied to rectifier 16 to produce a D.C. voltage output. Rectifier 16 may be a trickle charger. The D.C. voltage serves to charge both batteries 12 and 14. The sign 11 is kept energized by both batteries until the batteries 12, 14 become fully charged. Then the CPU 25 turns off the supply of engine fuel at the valve 24 to stop the engine 20 and the alternator 18. When the CPU 25 senses the batteries 12, 14 have become fully charged the voltage to the battery 14 is switched off.

The system 10 is entirely self-contained and requires no external source of electrical power to operate it. There are many possible applications for this system which can be installed in remote, isolated locations to operate automatically under its own local power supply. For example, the load 11 could be a radio transmitter, radar antenna, or other useful consumer of D.C. power.

It should be understood that the foregoing relates only to a limited number of preferred embodiments of the invention which have been by way of example only and that it is intended to cover all changes and modifications of the examples of the invention herein chosen for the purpose of the disclosure, which do not constitute departures from the spirit and scope of the invention.

What is claimed is:

1. A power supply system for D.C. load, comprising:
    a D.C. electrical load;
    a battery means connected to said load to energize the same with D.C. voltage;
    a central processing unit connected to said battery means to monitor said D.C. voltage, said central processing unit being arranged to recharge said battery means when the D.C. voltage from said battery means falls below a predetermined magnitude;
    a starter motor connected to said central processing unit and energized by said battery means when said D.C. voltage of said battery means falls below said predetermined magnitude;
    an engine mechanically coupled to said starter motor for cranking by said starter motor;
    a fuel supply connected to said engine to energize the same, said fuel supply being connected to said central processing unit to control supply of said fuel to said engine when said starter motor is energized to crank said engine, and when said engine is running;
    an alternator mechanically driven by said engine to generate A.C. voltage when said engine is running;
    a rectifier connected in circuit with said alternator and said battery means to apply rectified D.C. voltage to said battery means for recharging the same; so that said central processing unit cuts off said fuel supply to stop said engine and said recharging D.C. voltage when said battery means becomes fully charged; and
    a tachometer connected to said engine and said central processing unit for monitoring running speed of said engine, whereby said central processing unit allows for a warm-up period for said engine before allowing said A.C. voltage to be applied from said alternator to said rectifier for recharging said battery means.

2. A power supply system as claimed in claim 1, wherein said central processing unit comprises relay controlled switching means for connecting said battery means in circuit with said rectifier, so that said battery means is recharged by said rectifier.

3. A power supply system as claimed in claim 2, wherein said load is connected to said central processing unit and to said battery means so that said load is energized selectively by said battery means under control of said central processing unit.

4. A power supply system as claimed in claim 3, wherein said load is an illuminated sign arranged to be energized by said D.C. voltage.

5. A power supply system as claimed in claim 1, wherein said central processing unit comprises computerized microprocessor chip arranged to monitor said D.C. voltage of said battery means and further comprising means to actuate relay controlled switching means for connecting said battery means with said alternator when said D.C. of said battery means falls below said predetermined magnitude.

6. A power supply system as claimed in claim 5, wherein said predetermined magnitude is stored as data in an associated memory unit, said memory unit being resettable for changing said predetermined magnitude of said battery means D.C. voltage required to activate said starter, engine, alternator, and rectifier.

* * * * *